(No Model.)

M. F. LUCAS.
TUBE SAW.

No. 300,784. Patented June 24, 1884.

Figure 3:
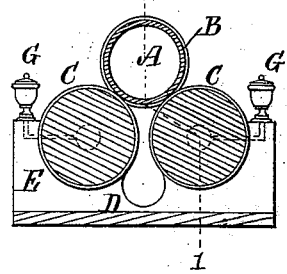

In part On line 1—1 of Figure 3.

Witnesses.
S. C. Means.
A. F. Hayden.

Inventor.
M. F. Lucas.
J. Curtis. Atty.

UNITED STATES PATENT OFFICE.

MILO FRANK LUCAS, OF WEST NEWTON, MASSACHUSETTS.

TUBE-SAW.

SPECIFICATION forming part of Letters Patent No. 300,784, dated June 24, 1884.

Application filed November 22, 1883. (No model.)

*To all whom it may concern:*

Be it known that I, MILO FRANK LUCAS, a citizen of the United States, residing at West Newton, in the county of Middlesex and State of Massachusetts, have invented certain new and useful Improvements in Tube-Saws; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to tubular saws which are supported on anti-friction rollers; and it consists in the combination, with a tubular saw provided with annular grooves at or near both ends, of anti-friction rollers which set into said grooves, the said rollers being journaled in independent bearings and of greater diameter than said saw.

Figure 1:
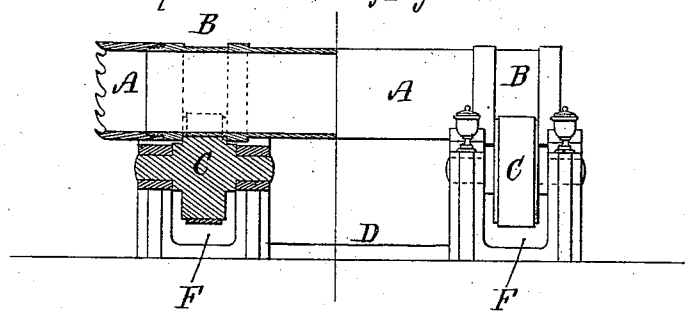
Figure 2:
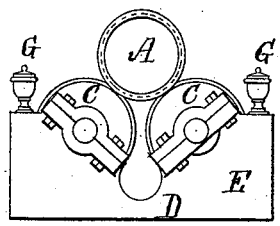

The drawings accompanying this specification represent, in Figure 1, a side elevation, in Fig. 2 an end elevation, and in Fig. 3 a vertical cross-section, of a tube-saw and its support, containing my invention.

In said drawings, A represents a tube-saw of ordinary construction.

In carrying out my improvements, I form at suitable points in the periphery of the saw shallow annular grooves B B, these grooves being of a width to closely receive the peripheries of anti-friction rollers C C, which constitute the support of the saw. These rollers are arranged in pairs at or near the ends of the saw, and obliquely below the same at the opposite sides thereof. Each roller C is journaled independently of all the others in the heads or bearings hereinafter described, and is of greater diameter than that of said tube-saw.

The bed-plate of the machine is shown at D, and contains at each end upright heads E E, with spaces F F, to receive the rollers, each roller being secured to a short horizontal shaft mounted in bearings in said heads. These rollers may be of metal or any other suitable material, and may, if found desirable or advantageous, have their peripheries covered with leather or other material. Suitable oil-cups, G G, are added to the top of each head, and operate automatically to lubricate the journals of the rollers C C through suitable oil-passages in said heads.

As before stated, the anti-friction rollers reduce the friction between the saw and its support to the minimum, at the same time receiving and sustaining the end-thrust upon the saw. As the bearings of each roller support independently its short shaft, there will be very little probability that any one of said shafts will be bent or broken by the end-thrust aforesaid. Both pairs of the rollers enter grooves, the one being at the forward end of the saw, the other at the rear end thereof. Consequently this strain is distributed equally among them and throughout the length of the saw. The large size of the rollers makes them less liable to fracture or giving way, and insures a better support for the saw than would otherwise be possible.

I claim—

1. A tubular saw provided with an annular groove near each end, in combination with supporting anti-friction rollers, which are arranged in pairs that take into said grooves, respectively, each roller being journaled independently of any other, substantially as set forth.

2. A tubular saw having annular grooves, in combination with anti-friction supporting-rollers and their supports, each roller being journaled independently of all the other rollers, substantially as set forth.

3. The base-plate D, having heads E, cast therewith, and provided with spaces F and oil-passages, as shown, in combination with oil-cups G, communicating with said passages, anti-friction rollers C, journaled independently in said heads, and having their journals oiled from said cups and passages, and the tubular saw A, having at or near its ends the grooves B, which, respectively, receive said rollers, substantially as set forth.

In testimony whereof I affix my signature in presence of two witnesses.

MILO FRANK LUCAS.

Witnesses:
A. F. HAYDEN,
THOS. T. BAILEY.